3,221,049
PROCESS FOR THE MANUFACTURE OF ALI-
PHATIC, OLEFINICALLY UNSATURATED
DICARBOXYLIC ACIDS
Wilhelm Riemenschneider, Ulrich Pintschovius, and Otto Probst, Frankfurt am Main, Germany, assignors to Farbwerke Hoechst Aktiengesellschaft vormals Meister Lucius & Brüning, Frankfurt am Main, Germany, a corporation of Germany
No Drawing. Filed Jan. 16, 1962, Ser. No. 166,684
Claims priority, application Germany, Jan. 26, 1961,
F 33,062
4 Claims. (Cl. 260—533)

The present invention relates to a process for the manufacture of aliphatic, olefinically unsaturated dicarboxylic acids.

It is known to prepare aliphatic dicarboxylic acids, such as maleic acid, by catalytically oxidizing hydrocarbons having the same number of carbon atoms. As hydrocarbons there are mainly used olefins or diolefins, i.e. butene and butadiene for the manufacture of maleic acid. In these processes the hydrocarbons are mixed with oxygen-containing gases, such as air, and conducted at elevated temperature over an oxidation catalyst. As catalysts there are mentioned, above all, the oxides of vanadium and molybdenum, which are used in variable proportions with other metal oxides with the addition of phosphates or phosphoric acid. It is likewise known that catalysts consisting of vanadium pentoxide and phosphoric acid supported on inert carriers give favorable yields of dicarboxylic acids in the reaction of olefinic hydrocarbons. These good results are obtained, above all, when using a catalyst which contains the components vanadium pentoxide and phosphoric acid in definite mixing proportions.

If in a contact tube the temperatures of a fixed bed catalyst are observed in the direction of flow, it is found that in most cases the temperature rises steeply after a certain heating distance. The temperature increase can amount to more than 100° C. even with the use of well cooled contact tubes. Such a temperature increase in a contact tube in the direction of flow is undesired, since at the points of high temperature side reactions may take place, for example formaldehyde and acetic acid may be formed or the hydrocarbons may be burned to carbon monoxide and carbon dioxide. In a strongly exothermal reaction, as is the oxidation of olefins to dicarboxylic acids, the hydrocarbons may be substantially converted into carbon dioxide and carbon monoxide without noticeable amounts of dicarboxylic acids being formed.

It has now been found that in the manufacture of aliphatic, olefinically unsaturated dicarboxylic acids from olefins and/or diolefins having 4 carbon atoms in a straight chain with a catalyst containing vanadium pentoxide, phosphoric acid and a carrier the aforesaid disadvantages can be avoided when the reactor is not filled with a uniform catalyst but with two or more zones or layers of catalysts having different activities. The catalytic activity of the layers which first come into contact with the fresh gas shall be somewhat lower than that of the following layers in the direction of flow. By this step the temperature maximum is strongly flattened and the temperature is substantially more uniform over the whole distance, whereby the yield is largely improved.

As catalysts of different activities there can be used the following combinations:

(1) The individual catalyst layers are distinguished from one another by a different content of phosphoric acid. In the layer containing the largest proportion of phosphoric acid—the content of vanadium pentoxide always being the same—the reaction is attenuated to the greatest extent.

(2) The catalytically active ingredients are used in equal or similar composition, while different carrier materials are employed. When operating at the same temperature, a catalyst applied to aluminum oxide as carrier is less active than a catalyst containing the same amount of catalytically active substance supported on a kieselguhr carrier.

(3) Catalysts having the same composition can be prepared in different ways. The individual components can be simply mixed and shaped. Alternatively, vanadium pentoxide can be first reacted with phosphoric acid. The compound obtained is then mixed with the carrier material and shaped bodies are formed. The catalyst obtained without any reaction between vanadium pentoxide and phosphoric acid is the one having the lowest activity.

(4) The steps indicated sub (1)–(3) can be combined, i.e. catalysts can be used which differ from one another in (a) the content of phosphoric acid, (b) the carrier materials and/or (c) the manufacturing methods.

As regards the step illustrated sub (1) it has been found that the proportion of vanadium pentoxide to phosphoric acid largely influences the working temperature of the catalyst. The activity of a catalyst not only depends on the absolute amounts of active ingredients supported on the carrier, but also to a decisive extent on the proportion of the components. Thus it is possible to control the temperature level of the oxidation so as to obtain optimum yields. The absolute amounts of active ingredients and the proportion of vanadium pentoxide to phosphoric acid can vary within rather wide limits. In the process of the invention the catalyst components are used in a molar ratio of 1:0.5 to 1:3, calculated as $V_2O_5$ and $P_2O_5$. The following table illustrates the reaction of 1.2% by volume of butene-1 in admixture with 98.8% by volume of air on catalysts having different compositions with a residence time on the catalyst of 0.3 second. Instead of air other gases containing molecular oxygen or oxygen itself can be used.

TABLE

| Carrier calcined kieselguhr, grams | $V_2O_5$, grams | $H_3PO_4$ (85%), grams | $V_2O_5/P_2O_5$ | Maximum yield in percent of theory | Temperature at maximum yield, ° C. |
|---|---|---|---|---|---|
| 234 | 18 | 77 | 1:2.65 | 47.5 | 500 |
| 234 | 28 | 92.5 | 1:2.04 | 45.5 | 480 |
| 234 | 42 | 105 | 1:1.54 | 43.0 | 460 |
| 234 | 56 | 120 | 1:1.33 | 47.0 | 440 |
| 234 | 100 | 178 | 1:1.10 | 46.5 | 430 |
| 234 | 200 | 292 | 1:0.90 | 44.5 | 420 |

The mixing proportion of $C_4$ hydrocarbons to air ranges from 1:99 to 1:49.

The table, which relates to the use of kieselguhr as carrier, reveals that maximum yields can be obtained with the most varying proportions of vanadium pentoxide to phosphoric acid. When, for example, a catalyst is used which contains little vanadium pentoxide, relatively large amounts of phosphoric acid must be added in order to obtain good yields. If, however, a catalyst containing a high proportion of vanadium pentoxide is used, a considerably smaller amount of phosphoric acid is required for obtaining the same yields. The table likewise shows that the advantage of a high proportion of vanadium pentoxide resides in a strong reduction of the oxidation temperature.

The process of the invention is carried out at a temperature in the range from 350 to 550° C. and with a residence time on the catalyst of 0.1 to 0.5 second. The above table only relates to kieselguhr as carrier material. Other carrier materials, such as aluminum, aluminum oxide, silica gel, porcelain, pumice, titanium dioxide, zirconium dioxide, silicon carbide or similar substances or mixtures thereof give fundamentally the same results, the numerical values, however, being different in each case.

Due to the higher content of phosphoric acid the layer in the reactor that reacts first with the gaseous stream has a lower catalytic activity. The oxidation reaction sets in gradually and slowly. The subsequent zones in the reactor, which come into contact with the gas mixture that has partially reacted, are more active owing to their lower content of phosphoric acid. In these catalyst layers the reaction takes place until all the residual hydrocarbon has been reacted.

Instead of using two layers the reactor can be filled with any number of layers, or by suitable steps the reactor can be filled in a manner such that fillings with continuous transitions are obtained. In each case the reaction is retarded and the reaction heat evolved is distributed over a greater catalyst range. Consequently, the heat can be better dissipated, the yields are improved and the amounts of by-products formed are reduced.

The catalyst can be produced by mixing in various ways the three components in the desired proportion. When a powdery carrier is employed, it is necessary to shape the mixture, for example in an extruder or a tablet compressing machine. Alternatively, aqueous solutions or suspensions of the active ingredients can be applied to preshaped carriers.

The dicarboxylic acids formed can be obtained either as anhydrides, for example by directly cooling the reaction gases after they have left the reactor, or by washing them with an organic solvent, or when washing with water in the form of aqueous solutions of the acids.

The process of the invention is suitable for oxidizing olefins or diolefins having 4 carbon atoms in a straight chain to obtain the corresponding olefinically unsaturated dicarboxylic acids or the anhydrides thereof. Thus butene-1, cis-butene-2, trans-butene-2, butadiene or mixtures of these substances can be oxidized, if desired in the presence of isobutene, n-butane or isobutane, to yield maleic acid, or 2-methyl-butene-2 can be reacted to citraconic acid.

The following examples serve to illustrate the invention, but they are not intended to limit it thereto.

Example 1

A vertical reactor consisting of a tube having an inner diameter of 25 mm., surrounded by a thicker jacket tube through which mercury was circulated, was filled with 1 liter of catalyst. A gas mixture was allowed to stream downward through the catalyst. The gas mixture was composed of 98.5% of air and 1.5% of a vaporized $C_4$ hydrocarbon mixture consisting of 42% by volume of butadiene
18% by volume of butene-1
7% by volume of trans-butene-2
2.6% by volume of cis-butene-2
7.4% by volume of n-butane
22% by volume of iso-butene
1% by volume of iso-butane Theoretically only 77% of the gaseous $C_4$ hydrocarbons (sum of the straight chain $C_4$ hydrocarbons) can contribute to the formation of maleic acid. The iso-compounds contained in the mixture were oxidized to yield $C_2$ and $C_1$ hydrocarbons. Therefore, the yield was calculated on the utilizable $C_4$ compounds only.

6.0 cubic meters of the reaction gas were used per hour, which corresponded to a residence time of 0.3 second at 390° C. The catalyst was heated to 390° C. by circulating the mercury under a pressure of 0.8 atmosphere gauge. After having left the reactor, the reaction gases were washed with water and thus freed from the maleic acid formed. The off gas was either eliminated or wholly or partially re-used in the reaction after having added fresh $C_4$ gas mixture and, if necessary, air or oxygen.

(A) When the reactor was filled with 1 liter of a catalyst consisting of 234 grams of kieselguhr
42 grams of $V_2O_5$
56 grams of $H_3PO_4$ (85%)

a yield of maleic acid of 47.2% was obtained.

(B) When 1 liter of a catalyst was used which consisted of 234 grams of kieselguhr
42 grams of $V_2O_5$
64 grams of $H_3PO_4$ (85%)

the yield of maleic acid amounted to 42.4%.

(C) When the reactor was filled with 1 liter of a catalyst consisting of 234 grams of kieselguhr
42 grams of $V_2O_5$
80 grams of $H_3PO_4$ (85%)

Example 2 a yield of maleic acid of 39.0% was obtained.

(D) When the reactor was filled with three layers of catalyst, the lower layer consisting of ⅓ liter of the catalyst defined sub (A) the middle layer consisting of ⅓ liter of the catalyst defined sub (B) and the upper layer consisting of ⅓ liter of the catalyst defined sub (C) a yield of 55.6% of maleic acid was obtained, calculated on the theory.

In the apparatus described in Example 1 a gas mixture of 1.2% by volume of the $C_4$ mixture defined in Example 1 and 98.8% by volume of air was passed over a catalyst. The catalyst was heated by a diphenyl bath kept at the boil at 375° C. under a pressure of 7.2 atmospheres gauge. 1 liter of catalyst was used consisting of 234 grams of kieselguhr
42 grams of $V_2O_5$
60 grams of $H_3PO_4$ (85%)

The yield of maleic acid amounted to 36%. The temperature peak in the interior of the catalyst was 500–510° C. about 40–50 cm. below the upper surface of the catalyst.

When, however, ½ liter of the last mentioned catalyst was filled in the lower part of the reactor and ½ liter of the catalyst defined in Example 1(A) there above and the gas mixture was allowed to flow through the whole catalyst under the conditions mentioned above, the yield amounted to 52.3% of the theory.

Example 3

The experiment was carried out under the conditions set forth in Example 2 with the two-layer catalyst, with the exception that instead of 1.2% by volume of the C₄ gas mixture defined in Example 1 there was used the same amount of a C₄ gas mixture consisting of 0.1% of iso-butene
15.8% of n-butane
13.0% of trans-butene-2
14.1% of cis-butene-2
1.0% of butadiene
0.5% of isobutene
55.5% of butene-1

The yield amounted to 43.4 mol percent of maleic acid.

Example 4

The lower part of the apparatus defined in Example 1 was charged with ½ liter of a catalyst obtained by reacting 28 grams of vanadium pentoxide and 92 grams of phosphoric acid of 85% strength with spontaneous heating and mixing the cake obtained with 234 grams of kieselguhr. The upper part of the reactor was filled with ½ liter of a catalyst which had the same composition but had been obtained by merely mixing all three components. When operating under the conditions set forth in Example 1, a yield of 54.5% of the theory was obtained. When using the upper catalyst alone the yield amounted to 45.5%, while the lower catalyst alone gave a yield of 50.5%.

Example 5

The reactor described in Example 1 was filled in the lower half with the catalyst defined in Example 4, which alone gave a yield of 50.5% of the theory. The upper part of the tube was charged with a catalyst obtained by reacting 26 grams of vanadium pentoxide with 50 grams of phosphoric acid of 85% strength with spontaneous heating and mixing the product obtained with 150 grams of aluminum oxide and 5 grams of graphite, which catalyst when used alone gave a yield of 47%. The reaction gases were conducted through both layers as described in Example 1 at a bath temperature of 400° C. The yield amounted to 53.2%.

We claim:
1. In the process for the manufacture of aliphatic olefinically unsaturated dicarboxylic acids by contacting molecular oxygen and an olefinic hydrocarbon selected from the group consisting of n-butenes, butadiene, and mixtures thereof, with a catalyst comprising vanadium pentoxide, phosphoric acid, and an inorganic carrier, the improvement of passing a mixture of said molecular oxygen and said olefin over a bed of said catalyst at a temperature of from 350° to 550° C. with a residence time on the catalyst of from 0.1 to 0.5 second, the catalytic activity of said bed increasing in the direction of flow of the gas mixture.

2. A process according to claim 1, wherein the catalytic activity of said bed is increased by decreasing the phosphoric acid to vanadium pentoxide ratio in the catalyst in the direction of flow of the gas mixture.

3. A process according to claim 2, wherein the phosphoric acid to vanadium pentoxide ratio decreases from 0.5 to 3.

4. A process according to claim 1, wherein the gases are passed through two layers of catalyst, the second layer having an increased activity as compared with the first one.

References Cited by the Examiner
UNITED STATES PATENTS

| | | | |
|---|---|---|---|
| 2,280,928 | 4/1942 | Pie | 260—662 |
| 2,773,838 | 12/1956 | Reid et al. | 252—437 |

LORRAINE A. WEINBERGER, *Primary Examiner.*

CHARLES B. PARKER, LEON ZITVER, *Examiners.*